Patented Nov. 29, 1932

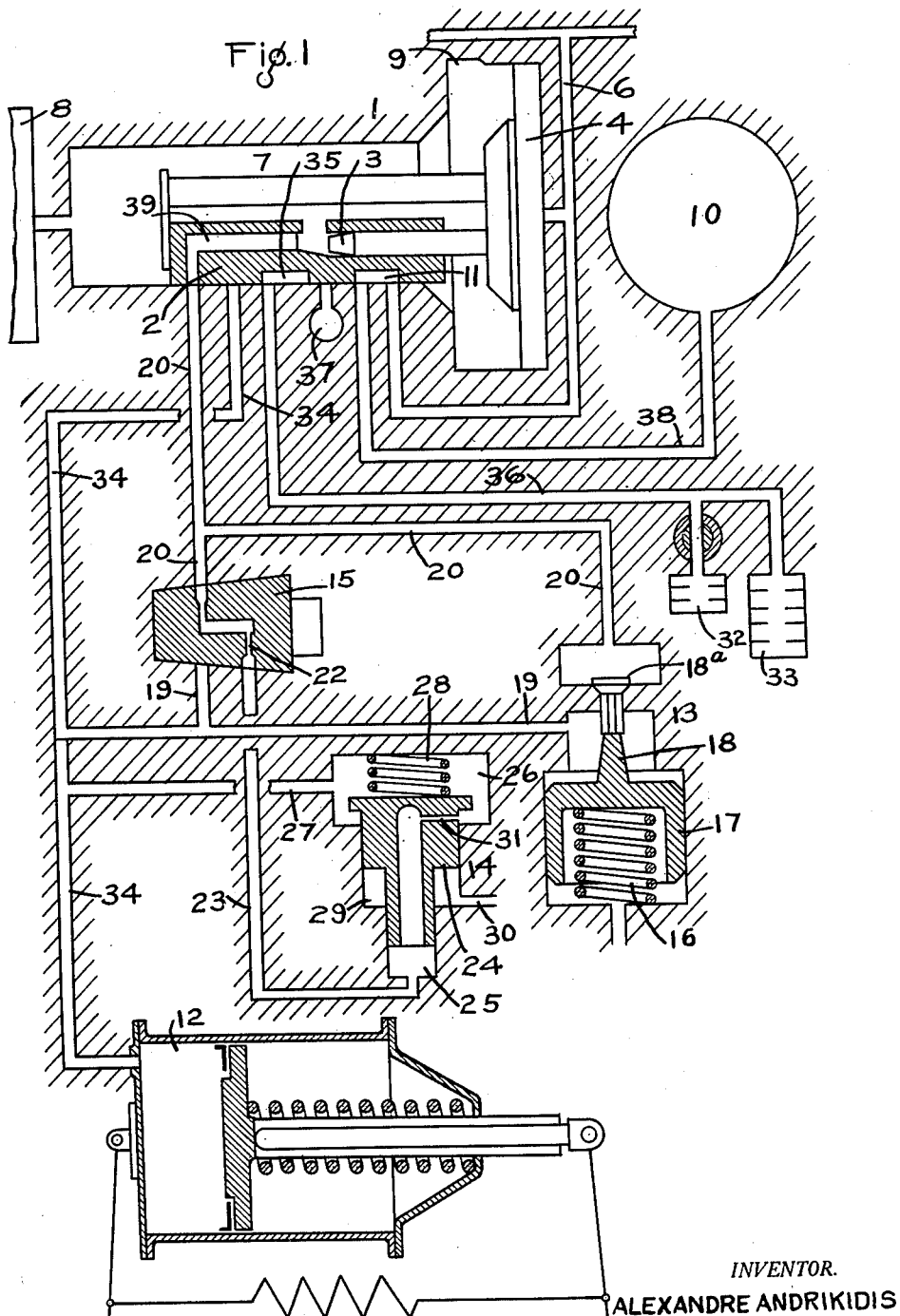

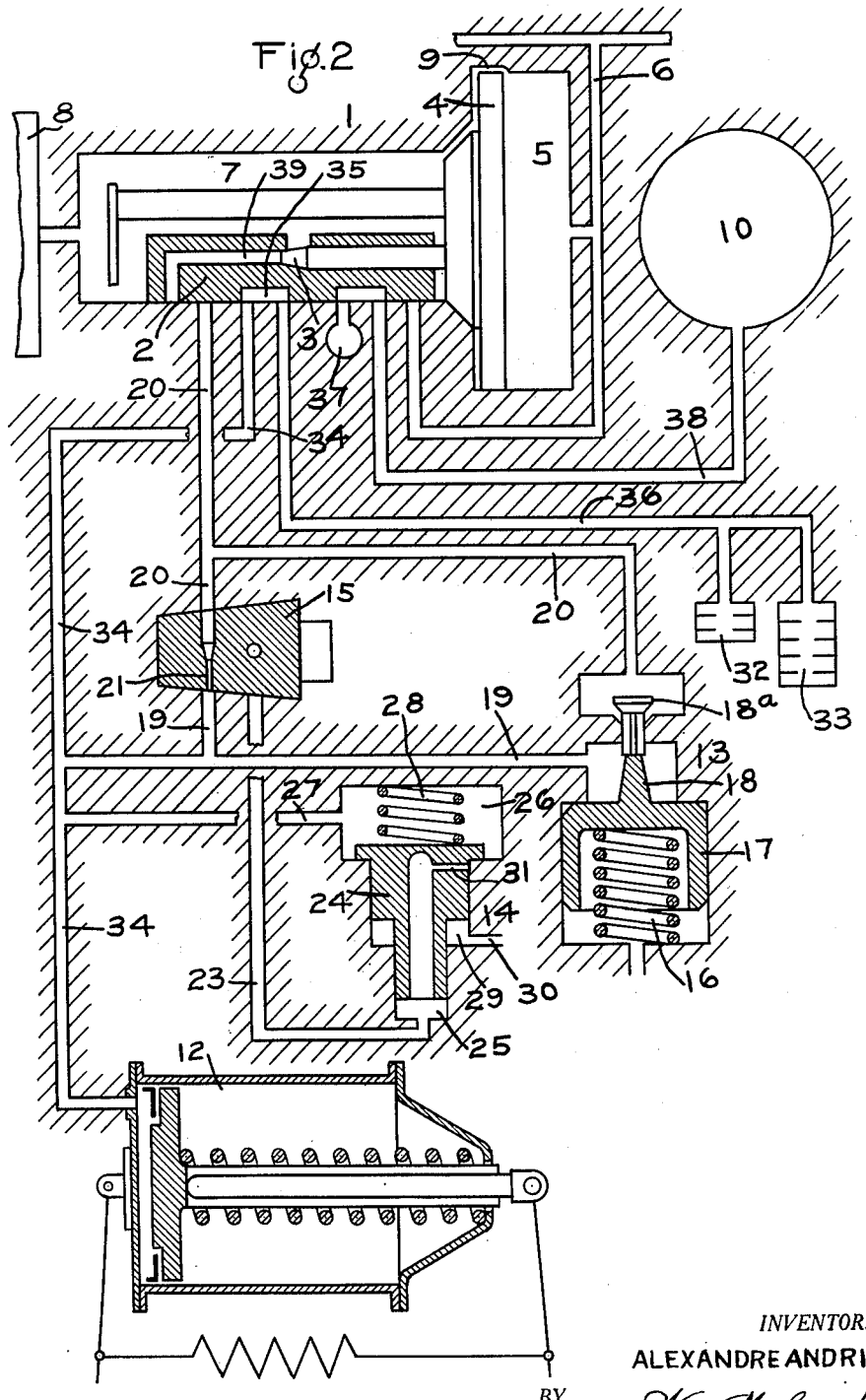

1,889,326

UNITED STATES PATENT OFFICE

ALEXANDRE ANDRIKIDIS, OF ATHENS, GREECE

FLUID PRESSURE BRAKE

Application filed November 14, 1930, Serial No. 495,664, and in Germany September 8, 1930.

This invention relates to fluid pressure braking apparatus for railway and the like vehicles of the kind in which the fluid pressure obtained in the brake cylinder upon an application of the brakes is arranged to be varied in accordance with the load on the vehicle by means of a change over valve or cock adapted to render a pressure limiting valve device associated with the brake cylinder effective upon an empty or lightly loaded vehicle, and ineffective upon a loaded vehicle.

According to the principal feature of the present invention the pressure limiting valve device is arranged to be influenced on the one hand by the fluid pressure obtaining in the brake cylinder, and on the other hand by the pressure of the fluid flowing to the brake cylinder when the distributing valve device is in its application position so that as soon as the pressure obtaining in the brake cylinder bears a predetermined relation to the pressure of the fluid being supplied to the brake cylinder, the pressure limiting valve device will be operated to cut off the supply of fluid.

The pressure limiting valve device is preferably arranged to be normally closed and to be opened to permit the supply of fluid to the brake cylinder upon an empty or lightly loaded vehicle by the pressure of fluid supplied through the triple or other form of distributing valve device.

In accordance with a preferred form of the invention the pressure limiting valve device is associated with the usual quick inshot or minimum pressure valve device, the pressure limiting valve device being arranged to be operated in such a manner that the restricted supply of fluid to the brake cylinder when the minimum pressure valve closes is effected through the pressure limiting valve device when the latter is operative as in the case of an empty or lightly loaded vehicle, the pressure limiting valve being only opened after the minimum pressure valve has closed.

When the pressure limiting valve device is rendered ineffective by the adjustment of the change-over valve or cock to its "load" position, the restricted supply of fluid to the brake cylinder is arranged to be effected through a suitable port in the change-over valve or cock.

In order that the invention may be readily understood it will now be described by way of example with reference to the accompanying drawings in which, Figure 1 is a schematic view of the braking apparatus constructed in accordance with the present invention showing the change-over valve or cock in its "light" or "empty" position, Figure 2 being a similar view with the change-over valve or cock in its "load" position.

Referring now to the drawings the braking apparatus comprises a triple or distributing valve device 1 having a main slide valve 2 and a graduating valve 3 adapted to be operated by a piston 4 subject in the piston chamber 5 to the fluid pressure obtaining in the train pipe 6, and in the slide valve chamber 7 to the pressure obtaining in the auxiliary reservoir 8 which is arranged to be supplied with fluid from the train pipe through the feed groove 9 when the piston 4 is in its release position as shown in Figure 2.

Associated with the triple or distributing valve device 1 are an acceleration bulb 10, to which fluid under pressure is arranged to be vented from the train pipe through a recess 11 in the slide valve 2 when the latter is in its application position (Figure 1), a brake cylinder 12, a quick inshot or minimum pressure valve device 13, a pressure limiting valve device 14, and a change-over cock 15.

The quick inshot or minimum pressure valve device 13 comprises a valve 18a arranged to be held open in the release position of the piston 4 as shown in Figure 2, by the spring 16 located below a piston 17 having a projection 18 therein adapted to co-operate with the valve 18a which controls communication between a passage 19 leading to the brake cylinder 12 and a passage 20 leading to the seat of the slide valve 2. The passage 20 is also adapted to be placed, on a heavily loaded vehicle, in communication with the passage 19 through a restricted port 21 in the change-over cock 15 (Figure 2) and to be placed, on an empty or lightly loaded vehicle, in communication through a restricted port 22 in the change-over cock 15 with a passage 23 leading to the pressure limiting valve device 14.

The pressure limiting valve device 14 comprises a differential piston 24 subject during an application of the brakes (Figure 1) on its smaller area in the chamber 25 to the pressure of the fluid in the passage 23 i. e. the pressure of the fluid flowing to the brake cylinder through the passage 20, and on its larger area in the chamber 26 to the pressure obtaining in the brake cylinder 12 and passage 27 and the pressure exerted by a light spring 28. A chamber 29 in the pressure limiting valve device is provided with an atmospheric port 30. Communication between the chambers 25 and 26 is arranged to be established in certain circumstances through a port 31 in the piston 24 as will hereinafter be described.

With the piston 4 of the triple or distributing valve device 1 in its release position shown in Figure 2, the brake cylinder 12 is in communication with the throttle exhaust outlets 32, and 33 through a passage 34, a recess 35 in the slide valve 2 and a passage 36, and the bulb 10 is in communication with an atmospheric outlet 37 through a passage 38 and the recess 11 in the slide valve 2. The passage 19 being connected to the passage 34 contains fluid at atmospheric pressure so that the piston 17 is held in its upper position by the spring 16 in which it maintains the valve 18a open. The chamber 26 in the pressure limiting valve device being connected to the passage 34 by way of passage 27, also contains fluid at atmospheric pressure and the piston 26 is maintained in its lowermost position in which communication between the chambers 25 and 26 through the port 31 is cut off.

When the train pipe pressure is reduced in order to effect an application of the brakes, the triple or distributing valve piston 4 will be moved to the right (Figure 1) under auxiliary reservoir pressure so as first to open the graduating valve 3 and then move the slide valve 2 to establish communication between the train pipe 6 and the bulb 10 through the recess 11 in the slide valve 2 and the passage 38 and also between the passage 20 and the auxiliary reservoir 8 through the valve chamber 7 past the open graduating valve 3 and through a passage 39 in the slide valve 2, communication between the passages 34 and 36 being interrupted so as to cut off the brake cylinder 12 from the atmospheric outlets 32 and 33.

Assuming that the change-over cock is in its "light" position as shown in Figure 1 fluid supplied to the passage 20 from the auxiliary reservoir 8 flows past the open valve 18a and through the passages 19 and 34 to the brake cylinder 12, and also through the restricted port 22 in the changeover cock 15 to the chamber 25 of the pressure limiting valve device. While the valve 18a is open the fluid pressure in the chamber 26 above the piston 24 builds up more rapidly than that in the chamber 25 below the piston owing to the relative cross-sectional areas of the port 22 and the port opened by the valve 18a. The area of the piston 24 on which the pressure in the chamber 26 acts being moreover greater than the area of the piston 24 on which the pressure in the chamber 25 acts, the piston is maintained in its lower position in which communication between the chambers 25 and 26 and thus between the auxiliary reservoir 8 and the brake cylinder 12 through the ports 22 and 31 is cut off.

The piston 17 of the quick inshot valve device 13 is arranged to be moved downwards against the action of the spring 16 and permits the valve 18a to close so that the flow of fluid to the brake cylinder 12 past the valve 18 is interrupted as soon as the brake cylinder pressure has attained a predetermined value, for example 0.6 atmospheres; however the differential piston 24 is arranged to be moved upwards and permits a restricted flow of fluid through the port 31 and passages 27 and 34 to the brake cylinder 12 as soon as the pressure building up in the chamber 25 owing to the flow of fluid through the port 22 in the cock 15 has attained a predetermined value.

The piston 24 is arranged to be moved downwards so as to cut off the flow of fluid through the restricted port 31 to the brake cylinder as soon as the fluid pressure in the latter has been built up by this flow to a predetermined value for example 2.2 atmospheres.

Thus an application of the brakes of an empty or lightly loaded vehicle is divided into two stages, one in which fluid is supplied to the brake cylinder relatively rapidly past the quick inshot valve 18a only, and one in which fluid is supplied relatively slowly through the restricted ports 22 and 31 only, until a predetermined pressure has been attained in the brake cylinder 12, whereupon the supply of fluid to the brake cylinder is cut off entirely.

Upon increasing the train pipe pressure in order to release the brakes, the brake cylinder 12, the chamber 26 in the pressure limiting valve device 14 and the passage 19 are connected to the atmospheric outlets 32 and 33 as hereinbefore described, and as soon as the brake cylinder pressure acting in the chamber above the piston 17 of the quick inshot valve device 13 has fallen to about 0.6 atmospheres the piston 17 is lifted by the spring 16 so that the valve 18a is opened.

It will be observed that in the case of a train pipe pressure reduction tending to cause a brake cylinder pressure greater than the maximum pressure permitted by the pressure limiting valve device 14, this valve will be closed as soon as the maximum pressure is attained so that the flow of fluid from the auxiliary reservoir 8 is interrupted at the pressure limiting valve device 14. The graduating valve 3 of the distributing valve device 1 will still however remain open so that in the event of the brake cylinder pressure decreasing owing to leakage for instance, the piston 24 of the pressure limiting valve device 14 will be moved upwards once more and the pressure in the brake cylinder built up to the maximum pressure permitted by the pressure limiting valve device by flow of fluid from the auxiliary reservoir past the graduating valve 3 and through the passages 39 and 20 and restricted ports 22 and 31 and passages 27 and 34.

Upon a heavily loaded vehicle the cock 15 is turned to its "load" position as shown in Figure 2 in which the passage 23 is blanked by the cock and the pressure limiting valve device 24 cut out of action.

An application of the brakes is effected on a heavily loaded vehicle in a similar manner to that described above with reference to an empty or lightly loaded vehicle but in the case of a heavily loaded vehicle a restricted flow of fluid is permitted through the port 21 in the cock 15 both while the valve 18a is open and after the latter is closed. Moreover, the restricted flow of fluid to the brake cylinder may in this case be permitted until the auxiliary reservoir and brake cylinder pressures have equalized at a common pressure dependent upon the relative volumes of the auxiliary reservoir 8 and brake cylinder 12, but which may be equivalent to about 3.75 atmospheres.

It will be evident that the invention is not limited to the particular construction and arrangement of parts hereinbefore described which may be varied as desired to suit particular requirements without exceeding the scope of the invention.

Having now described my invention, what I claim as new and desire to secure by Letters Patent is:—

1. In an empty and load fluid pressure brake, the combination with a brake cylinder and a fluid pressure supply passage, of two pressure limiting valve devices interposed in parallel with one another between the said supply passage and the brake cylinder, and means for cutting one of said pressure limiting valve devices out of action on a loaded vehicle, and simultaneously opening a relatively restricted port between said supply passage and said brake cylinder.

2. In an empty and load fluid pressure brake, the combination with a brake cylinder and a fluid pressure source, of a normally closed maximum pressure limiting valve device interposed between said source and said brake cylinder and operated by the pressure of fluid supplied from said source for opening communication from said source to the brake cylinder.

3. In an empty and load fluid pressure brake, the combination with a brake cylinder and a fluid pressure source, of a normally closed pressure limiting valve device interposed between said source and said brake cylinder and operated by the pressure of fluid supplied from said source for opening communication from said source to the brake cylinder, and means for cutting said pressure limiting valve device out of action on a loaded vehicle.

4. In an empty and load fluid pressure brake, the combination with a brake cylinder and a fluid pressure supply passage, of a normally open pressure limiting valve device, interposed between the said supply passage and the brake cylinder and operated upon a predetermined increase in brake cylinder pressure for closing communication from said supply passage to the brake cylinder, a normally closed pressure limiting valve device in parallel with said normally open pressure limiting valve device and operated by the pressure of fluid supplied from said source for opening communication from said source to the brake cylinder, and means for cutting the normally closed pressure limiting valve device out of action on a loaded vehicle.

5. In an empty and load fluid pressure brake, the combination with a brake cylinder and a fluid pressure supply passage, of a normally open pressure limiting valve device, interposed between said supply passage and the brake cylinder and operated upon a predetermined increase in brake cylinder pressure for closing communication from said supply passage to the brake cylinder, a normally closed pressure limiting valve device in parallel with said normally open pressure limiting valve device and operated by the pressure of fluid supplied from said source for opening communication from said source to the brake cylinder, and means for cutting the normally closed pressure limiting valve device out of action on a loaded vehicle, and simultaneously opening a relatively restricted port between said supply passage and said brake cylinder.

6. In an empty and load fluid pressure brake, the combination with a brake cylinder and a fluid pressure source, of a maximum pressure limiting device interposed between said source and said brake cylinder, and comprising an abutment having a normally closed port therein through which fluid is supplied from said source to the brake cylinder, and subject on one side to the fluid pressure obtaining in the brake cylinder, and on the other side to the pressure supply flowing to the brake cylinder from the source and operated by the pressure supply to open said port.

7. In an empty and load fluid pressure brake, the combination with a brake cylinder and a fluid pressure supply passage of a maximum pressure limiting device interposed between said source and said brake cylinder, and comprising a differential piston having a normally closed port therein, and subject on one side to the pressure obtaining in the brake cylinder, and on the other side to the pressure of the fluid flowing through the supply passage to the brake cylinder and operated by the pressure supply to open said port.

8. In a fluid pressure brake, the combination with a brake cylinder, a source of fluid under pressure, and a brake controlling valve device operative to supply fluid under pressure from said source to the brake cylinder, of an inshot valve device for controlling a communication through which said controlling valve device supplies fluid from said source to the brake cylinder, and operated upon a predetermined increase in brake cylinder pressure for closing said communication, and a pressure regulating valve device operated by the pressure of fluid supplied from said source to open an additional communication from said source to the brake cylinder.

9. In a fluid pressure brake, the combination with a brake cylinder, a source of fluid under pressure, and a brake controlling valve device operative to supply fluid under pressure from said source to the brake cylinder, of an inshot valve device for controlling a communication through which said controlling valve device supplies fluid from said source to the brake cylinder, and operated upon a predetermined increase in brake cylinder pressure for closing said communication, and a pressure regulating valve device subject to the opposing pressures of the brake cylinder and the pressure of fluid supplied from said source and operated upon a predetermined increase in brake cylinder pressure for opening a by-pass communication through which fluid is supplied from said source to the brake cylinder.

In testimony whereof I have hereunto set my hand.

A. ANDRIKIDIS.